(12) United States Patent
Gruet et al.

(10) Patent No.: US 9,847,867 B2
(45) Date of Patent: Dec. 19, 2017

(54) METHOD FOR SELECTING AN HD-FDD DUPLEXING MODEL

(71) Applicant: CASSIDIAN SAS, Elancourt (FR)

(72) Inventors: Christophe Gruet, Montigny le Bretonneux (FR); Eric Georgeaux, Montigny le Bretonneux (FR)

(73) Assignee: AIRBUS DS SAS, Elancourt (FR)

( * ) Notice: Subject to any disclaimer, the term of this patent is extended or adjusted under 35 U.S.C. 154(b) by 0 days.

(21) Appl. No.: 14/373,782

(22) PCT Filed: Dec. 17, 2012

(86) PCT No.: PCT/EP2012/005219
§ 371 (c)(1),
(2) Date: Jul. 22, 2014

(87) PCT Pub. No.: WO2013/107488
PCT Pub. Date: Jul. 25, 2013

(65) Prior Publication Data
US 2014/0348042 A1    Nov. 27, 2014

(30) Foreign Application Priority Data
Jan. 20, 2012 (FR) .................... 12 00176

(51) Int. Cl.
*H04W 4/00* (2009.01)
*H04L 5/16* (2006.01)
(Continued)

(52) U.S. Cl.
CPC ............. *H04L 5/16* (2013.01); *H04B 7/2656* (2013.01); *H04W 28/18* (2013.01);
(Continued)

(58) Field of Classification Search
CPC ...... H04L 5/14; H04W 72/21; H04W 72/1226
See application file for complete search history.

(56) References Cited

U.S. PATENT DOCUMENTS

| | | | | |
|---|---|---|---|---|
| 2001/0043660 A1* | 11/2001 | Blakeney, II | .......... | H04B 7/264 375/377 |
| 2006/0045003 A1* | 3/2006 | Choi | .................... | H04L 27/261 370/208 |

(Continued)

FOREIGN PATENT DOCUMENTS

| | | |
|---|---|---|
| WO | 2009/048764 | 4/2009 |
| WO | 2009/051455 | 4/2009 |

OTHER PUBLICATIONS

International Search Report and Written Opinion for Int. App. No. PCT/EP2012/005219, dated Mar. 26, 2013.

*Primary Examiner* — Kevin C Harper
(74) *Attorney, Agent, or Firm* — Pillsbury Winthrop Shaw Pittman LLP

(57) ABSTRACT

The object of the present invention is a method for selecting a terminal of an HD-FDD duplexing model. The invention enables the complexity of a switch of a terminal operating in an HD-FDD duplexing mode, at a level equivalent to that of a terminal operating in a TDD or FDD duplexing mode, to be reduced. To do this, thanks to the invention, it is provided that the terminal operating in an HD-FDD duplexing mode receives notifications or information via a network that programs the HD-FDD terminals through different uplink and downlink transmission models illustrated in FIG. 1. It may also be provided that the terminal operating in an HD-FDD duplexing mode has knowledge of the HD-FDD model to use for its communication. In this event, the complexity of its communication is reduced to the same level as that of a terminal operating in TDD mode.

5 Claims, 2 Drawing Sheets

(51) Int. Cl.
  *H04B 7/26* (2006.01)
  *H04W 74/08* (2009.01)
  *H04W 28/18* (2009.01)
  *H04W 72/04* (2009.01)
  *H04W 88/06* (2009.01)

(52) U.S. Cl.
  CPC ..... *H04W 72/048* (2013.01); *H04W 74/0833* (2013.01); *H04W 88/06* (2013.01)

(56) References Cited

U.S. PATENT DOCUMENTS

| | | | | |
|---|---|---|---|---|
| 2007/0041347 | A1* | 2/2007 | Beale | H04W 48/10 370/335 |
| 2008/0112356 | A1* | 5/2008 | Jung | H04L 5/0053 370/328 |
| 2009/0092066 | A1 | 4/2009 | Chindapol et al. | |
| 2009/0296609 | A1* | 12/2009 | Choi | H04W 72/121 370/281 |
| 2013/0083667 | A1* | 4/2013 | Persson | H04W 24/10 370/242 |

* cited by examiner

Fig. 1

METHOD FOR SELECTING AN HD-FDD DUPLEXING MODEL

FIELD OF THE INVENTION

The object of the present invention is a method for selecting an HD-FDD duplexing model. The object of the invention is to reduce the complexity of the terminal switching system operating in an HD-FDD duplexing mode.

PRIOR ART AND TECHNICAL PROBLEMS ENCOUNTERED

In the prior art, a communication terminal is able to communicate with a recipient entity across a radio communication network based on duplexing. This duplexing may be FDD (Frequency Division Duplexing), well known to the person skilled in the art. This FDD duplexing comprises two different frequency bands used for the downlink (DL)—otherwise known as reception—and for the uplink (UL)—otherwise known as transmission.

The communication network between the terminal and the recipient entity may also be based on TDD (Time Division Duplexing) duplexing, in which a single frequency band is used for receiving and transmitting. Therefore receiving and transmitting take place at different times.

FDD duplexing requires frequency spacing between the receiving and transmitting bands, also known as a guard frequency band, while TDD duplexing requires temporal spacing between transmitting and receiving, also known as guard time.

In the case of TDD duplexing, the spacing must be sufficient to enable a transmitted signal to reach a receiving terminal before it is in a transmission interval and therefore before its reception is inhibited. Even if this spacing is relatively short, when changes in state between the receiving and transmitting mode are done several times per second, a short temporal spacing delay reduces capacity in proportion to this delay. This may be acceptable for communications over short distances but may become problematic over long distances.

In the case of FDD type duplexing, it is necessary that the guard frequency band width is sufficient to enable the receiver to not be unduly affected by the transmitter signal. To do this, the placement of very selective filtering may be required. Then such filters should be placed at the base station level but also at the level of the terminals. These filters have three major disadvantages: Their bulk, their electrical consumption and their price. For systems with low guard band width, for example on the order of 10 to 30 MHz, the use of such filters results in a cost and size that is too high and too bulky for portable mobile equipment.

Another duplexing mode also exists, the HD-FDD (Half-Duplex Frequency Division Duplexing) mode. As with the FDD mode, two different frequency bands are used for transmitting and receiving. However, the transmitting and receiving periods are spaced apart in time. Therefore, terminals and base stations no longer need to be equipped with filters to separate the two frequency bands. Therefore, this duplexing mode is possible with portable mobile equipment.

This mode leads to introducing scheduling restrictions for using radio resources that are regularly allocated, for example every 1 ms in an LTE (Long Term Evolution) network. In order to avoid the simultaneous use of frequency bands in uplink UL and downlink DL, provided to connect the terminal in HD-FDD, a radio resource controller located in a base station of the LTE network may decide to allocate downlink DL or uplink UL resources according to the established DL/UL transmission model. This resource allocation is defined by taking some obligatory specificities for LTE network transmission into consideration. One of these specificities is relative to the need for the terminal to receive or not receive an acknowledgement that may be produced 4 ms after each downlink allocation. In addition, another LTE network transmission specificity is that to authorize a UE terminal to use the uplink UL, it must alert said UE terminal over the downlink DL 4 ms before its transmission.

In that relating to monitoring and measuring functions, the HD-FDD mode adds a certain complexity compared to the FDD or TDD modes.

In fact, in the FDD mode, the insulation between the reception Rx and the transmission Tx is sufficient such that monitoring and/or measuring functions may be performed without taking the fact that the transmitter is activated ON, or deactivated OFF, into consideration.

In addition, in the TDD mode, the configurations of an uplink UL and a downlink DL are set for a given cell, said cell being known by the switch of the terminal.

In the HD-FDD mode, the monitoring and/or measuring functions are made more complex due to the absence of prior knowledge of times during which these functions may be implemented. In fact, these functions may be inhibited during transmission times. These transmission times are decided by the base station and communicated to the terminal less than 4 ms before their occurrence. Therefore this requires strong interaction between the entity of the terminal that receives and decodes information from the base station indicating a transmission time to the terminal and the entity that governs the implementation of monitoring and/or measuring functions. This interaction is not necessary in FDD mode, since the monitoring and/or measuring functions may be implemented continuously, or in TDD mode, since the times during which the monitoring and/or measuring functions may be implemented are periodic and known in advance. Therefore a need to reduce the complexity of the switch associated with monitoring and measuring functions of an HD-FDD terminal exists.

DISCLOSURE OF THE INVENTION

The present invention aims to resolve all of the disadvantages from the prior art. To do this, the invention proposes a method to select an HD-FDD duplexing model by the network or by the terminal.

The invention enables the complexity of a switch of a terminal operating in an HD-FDD duplexing mode, at a level equivalent to that of a terminal operating in a TDD or FDD duplexing mode, to be reduced. To do this, thanks to the invention, it is provided that the terminal operating in an HD-FDD duplexing mode receives notifications or information via a network that programs the HD-FDD terminals through different uplink and downlink transmission models illustrated in FIG. 1. It may also be provided that the terminal operating in an HD-FDD duplexing mode has knowledge of the HD-FDD model to use for its communication. In this case, the complexity of its communication is reduced to the same level as that of a terminal operating in TDD mode. In the invention, the selection of the HD-FDD model may be done either by the network or by the mobile.

Therefore an object of the invention is a method to select a half duplex frequency division duplexing FDD mode for wireless communication entities in which transmission from a terminal across a radio communication network is carried out on an HD-FDD duplexing model characterized in that the method comprises a step of selecting an HD-FDD duplexing model from among a set of models, according to the notifications from the network or terminal.

The invention also comprises any one of the following characteristics in which:

- a new field specific to the selection of the HD-FDD duplexing model is created by the network, a message comprising this field being transmitted to the terminal;
- this new field is introduced into a radio resource configuration message, so as to modify the index relative to the duplexing model that was selected for said terminal;
- the terminal or network selects an HD-FDD duplexing model from information from the network or from the terminal respectively according to selection rules known by the network and said terminal.
- preamble sequence sets, used for accessing the network, are separated into subsets respectively associated with an HD-FDD duplexing model, the preamble being intended to indicate to the network the presence of a random access attempt of the terminal, from the receipt of a preamble sequence number, the terminal or the network derives the associated duplexing model;
- the selection of the HD-FDD duplexing model also depends on the occupation rate of each model;
- the network accepts or rejects the HD-FDD duplexing model selected by the terminal (UE);
- temporary identity values TC-RNTI included in the random access responses are separated into subsets respectively associated with an HD-FDD duplexing model, from the receipt of an TC-RNTI value, the terminal derives the associated duplexing model;
- the possible transmission times of a RACH response are separated into subsets respectively associated with an HD-FDD duplexing model, from the receipt of the RACH response, the terminal evaluates the transmission time and thereby derives the associated duplexing model.

BRIEF DESCRIPTION OF THE FIGURES

The invention will be better understood upon reading the following description and examining the accompanying figures. The figures are presented for illustrative purposes and in no way limit the invention. The figures show:

FIG. 1: a schematic representation of conventional HD-FDD transmission models;

DESCRIPTION OF THE INVENTION

The present invention will now be described in detail with reference to some preferred embodiments, as illustrated in the attached drawings. In the following description, numerous specific details are provided to offer a thorough understanding of the present invention. However, it will be evident to the person skilled in the art that the present invention may be carried out without part or all of these specific details.

In order to not uselessly obscure the description of the present invention, well-known structures, devices or algorithms are not described in detail.

Figure 1:
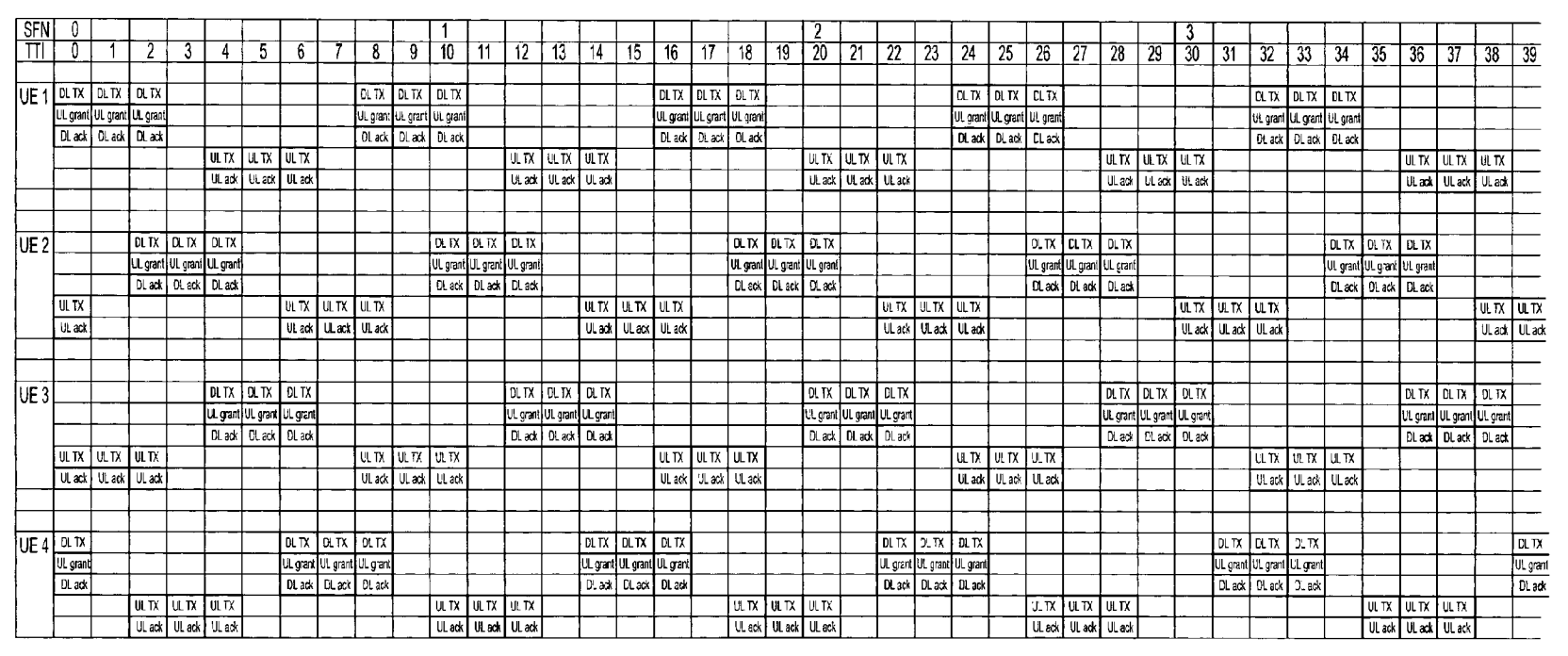

FIG. 1 is a conventional schematic representation of an HD-FDD transmission model. This transmission model illustrates that each HD-FDD terminal subsequently referenced UE1, UE2, UE3, UE4 respectively, is assigned to a group of terminals from among several groups. Transmission from a terminal in a given group is carried out over four different HD-FDD models illustrated in FIG. 1.

Each HD-FDD model comprises three subframes of 1 ms each, provided for transmission during downlink periods, subsequently referenced DL-TX, followed by three subframes, also of 1 ms, provided for transmission during uplink periods, subsequently referenced UL-ACK.

1 ms of blank subframe is systematically inserted between each of the downlink DL and uplink UL periods, in order to easily control the switching between the two transmission modes.

In general, the mobile terminal does not need to know the model on which it has been placed. Because of this, the terminal must continuously monitor the signal of the downlink, unless it must transmit due to several indications received from the network such as:

PUSCH/PUCCH (Physical Uplink Shared Channel/Physical Uplink Control Channel) transmissions, SRS (Sounding Referencing Signal) transmissions, or PRACH (Physical Random Access Channel) transmissions.

The transmission channels cited above are physical channels in uplink UL. The PUSCH (Physical Uplink Shared Channel) channel transports user data and high-layer signaling. The PUCCH (Physical Uplink Control Channel) channel transports control information, comprises ACK and NACK responses from the terminal to downlink transmissions relative to the HARQ mechanism. The PRACH (Physical Random Access Channel) channel transports the random access preamble sent by the terminals to the access network.

During times in which the terminal is activated for an uplink UL transmission, said terminal must consequently react regarding the capture of downlink DL-RX samples, used to estimate the channel, or CQI (Channel Quality Indicator) for similar measures.

Figure 2:
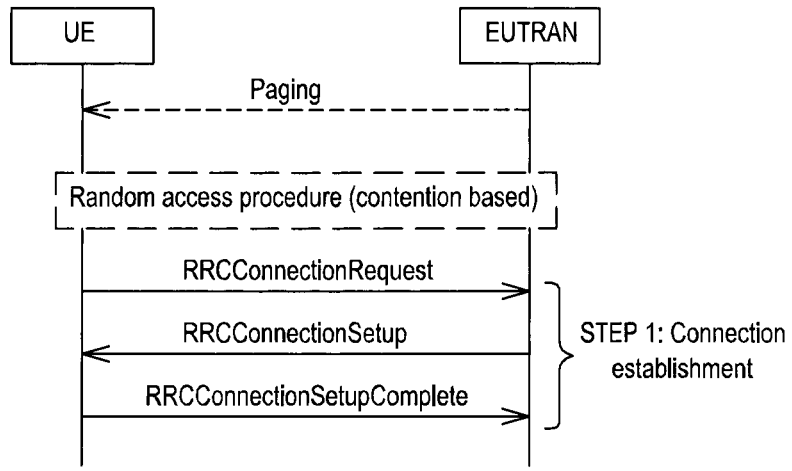
FIG. 2: a schematic representation of narrow band and broad band devices, according to a first embodiment of the invention.

FIG. 2 describes a schematic block diagram of a communicating entity of communicating origin with a recipient communicating entity across a radio communication network.

The communicating entities may be mobile radio terminals or else terrestrial or satellite base stations or else access points. FIG. 2 illustrates a UE terminal in communication with the UTRAN (for UMTS Terrestrial Radio Access Network), which is the UMTS (Universal Mobile Communication System) access network. NodeB is the access network entity responsible for radio transmission and reception with the UE terminal. In an LTE (Long Term Evolution) network, the only entity present in the access is the eNodeB, which may be equated to NodeB+RNC, where RNC corresponds to Radio Network Controller. eNodeB is therefore responsible for radio transmission and reception with the UE terminal.

The communication network may be a wireless network, a cellular communication network of the UMTS type and its evolutions including 3GPP-LTE (for 3rd Generation Partnership Project-Long Term Evolution).

In the embodiment from FIG. 2, after establishing RACH (Random Access CHannel) access, the terminal sends a request to the base station (or eNodeB) by indicating its intent to be placed in the connected RRC (Radio Resource Controller) mode.

RACH is a specific transport channel supporting limited information control. It is used during the first phases of establishing communication between the terminal and the eNB base station, or in the event of a change of state of the RRC. RACH access is broken down into four distinct phases:

- a first phase consists of sending by the terminal over the uplink UL an expected code word that is detectable by a base station eNB;
- a second phase consists of detecting by the base station eNB the arrival of this code word, thereby deducing that access is requested. The base station eNB is able to do this, determine the round trip time, in order to for example determine the distance of the terminal compared to the base station to characterize the relationship of said base station with said UE terminal. The eNB base station thus informs the resource manager so that it authorizes or doesn't authorize access of the terminal to the network. If the resource manager authorizes this access, it proposes via the downlink DL an uplink UL resource so that the terminal may establish communication.
- a third phase consists of the UE terminal using the uplink UL resource proposed by the resource manager to initiate its official connection request by specifying an absolute identity;
- a fourth phase consists in that the response to this connection request is carried out by the base station that specifies the identity of the UE terminal to which it is sent. This resolves a possible risk of conflicts (contention-based) between two terminals that request a resource at the same time, while they may each believe, due to their previous exchanges with the base station eNB, that they are served individually.

The eUTRAN base station reports its decision and the parameters relative to establishing the connection to the terminal, by means of the RRC connection installed. This embodiment of the method of the invention consists of introducing a new specific field in the RRC connection installation message, referenced "RRCConnectionSetup," more precisely in the information element dedicated to configuring radio resources, in order to explicitly modify the index relative to the HD-FDD duplexing mode that was selected for this terminal. The HD-FDD duplexing mode is selected according to one of the four models illustrated in FIG. 1.

Figure 3:
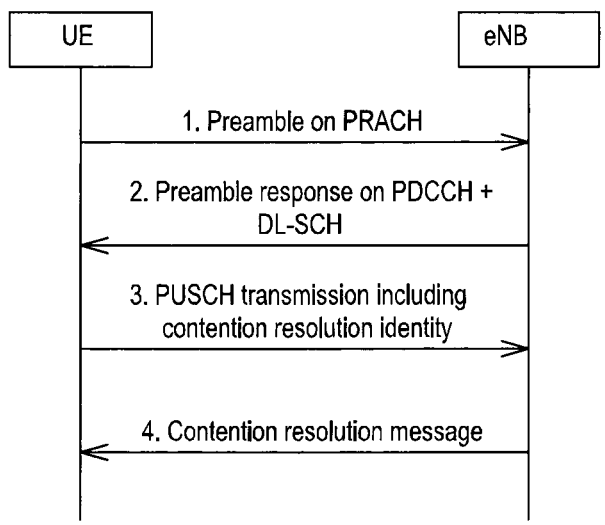
FIG. 3: a schematic representation of narrow band and broad band devices, according to another embodiment of the invention.

FIG. 3 is an illustration of a second embodiment according to the invention. In this second embodiment, access to RACH is a specific mechanism providing unconnected terminals with opportunities to be detected by the base station eNodeB (Evolved Node Base), referenced eNB, carried out subsequent to establishing the RRC connection.

Thus, during a random access procedure of a UE terminal to a base station eNB, the control unit of said UE terminal transmits a random access preamble. The main goal of preamble transmission is to indicate to the base station eNB the presence of a random access attempt and to enable the base station to estimate the delay between said base station eNB and the UE terminal. The estimated delay will subsequently be used to adjust the synchronization of the uplink UL. Each cell has sixty-four preamble sequences available. These sixty-four sequences are subdivided into three sets, in which the first set is reserved for the RACH procedure without risking conflicts (contention-free) and the other two sets are reserved for the RACH procedure with a risk of conflicts (contention-based).

When a random access attempt is being executed, the UE terminal randomly selects, in one of the two sets reserved for the RACH procedure with a risk of conflicts (contention-based), a preamble sequence and carries out an attempt.

To reestablish synchronization of the uplink of the UE terminal, in other words, an intercellular transfer generally known as a "handover," or a positioning of the UE terminal in a cell, said UE terminal receives, from the network and via the base station eNB, a sequence number of the preamble from the first set reserved for the RACH procedure without a risk of conflicts (contention-free).

In the two cases, the sequence number of the preamble may be used to implicitly derive the duplexing model from a rule known by the terminal and the network.

Therefore the invention consists of separating the sets of preamble sequences, used for the initial RACH access, into four subsets thus corresponding to the four HD-FDD duplexing models illustrated in FIG. 1. In addition, it is understood that this concept may be easily generalized to as many duplexing models M as are available. In the example illustrated in FIG. 1, the number of models is limited to four. This number of models is not limited, it may be less than or greater than four. The subsets may, for example, be defined by a simple rule such as HD-FDD_pattern_group=mod (RACH_preamble_sequence, M).

In an embodiment, in case of an arrangement without risk of conflicts (contention-free), by selecting a sequence in one of the four predefined subsets, the network then has the opportunity to indicate a specific HD-FDD model to the terminal.

In another embodiment, in case of an arrangement with a risk of conflicts (contention-based), by selecting a sequence in one of the four predefined subsets, the terminal then has the opportunity to indicate a specific HD-FDD model to the network.

In another embodiment, the network or terminal, in case of an arrangement without or with risks, selects a sequence in one of the four predefined subsets, so as to respectively indicate to the terminal or to the network a specific HD-FDD model.

To help the UE terminal try to connect, it may be of interest to broadcast over the cell, through the system information messages, the current occupation rate for each HD-FDD model controlled by base station eNB. On the basis of this information, the terminal may decide to select a model with a low occupation rate.

In the two cases, the network and the terminal will have common knowledge of the HD-FDD model to use for the current communication initiated by the PRACH procedure.

In one variation of embodiment, in response to detection of a random access attempt, the base station eNB will transmit a message over the downlink synchronization channel DL-SCH, containing various information, particularly including the correction time calculated by the random access preamble receiver.

All of the terminals that transmitted a preamble manage control channels for random access responses during a predefined time period. Preferably, the time period for this response is not set so as to be able to sufficiently respond to simultaneous accesses. It also enables a certain flexibility in the implementation of the base station eNB. If the terminal does not detect a random access response during the predefined time period, the attempt will be declared as unsuccessful and the procedure will be reiterated. This reiteration may be carried out with an increased preamble transmission power.

The time period may be between two to ten frames after transmission of the preamble (one frame being equal to 1 ms in LTE). The index of the frame in which the RACH response occurs may be an explicit indication of the HD-FDD model, on which situating the UE terminal was decided.

From correspondence between the transmission times of the RACH response and the HD-FDD models known to both the network and the mobile terminal, said terminal will deduce the HD-FDD model that the network will use for the rest of the communication from the time position at which it receives the RACH response.

In another embodiment, the group of HD-FDD models is derived from the TC-RNTI value included in the RAR (Random Access Response). In the case of a risk of conflicts (contention-free), the RAR random access response comprises a temporary TC-RNTI identity. As for the preamble sequence, the set of TC-RNTI values may be divided into M subsets such that the UE terminal knows the HD-FDD model that is assigned. This knowledge is obtained by a verification of the subset to which the TC-RNTI received by the terminal belongs.

The procedure for sharing information relative to the HD-FDD model between the UE terminal and the network may be a combination of embodiments described above.

For example, in the event where the HD-FDD model is selected by the UE terminal through the preamble sequence number, the base station eNB may decide to accept or refuse the HD-FDD model requested by the UE terminal via the RAR position in the predefined time period method or via the TC-RNTI method. It may be decided a priori that requests from the UE terminal are always satisfied with a certain degree of flexibility.

The invention claimed is:

1. A method of selecting a, Half Duplex Frequency Division Duplexing (HD-FDD) model for wireless communication entities comprising a terminal and a radio communication network, wherein:
    wireless communication between the radio communication network and the terminal is carried out according to a selectable HD-FDD model;
    the network or the terminal selects an HD-FDD model from among a set of models based on information from the terminal or from the network, respectively, according to selection rules known by said network and said terminal;
    information identifying the HD-FDD model selected by one entity is derived from information related to either an initial RACH message or to a random access response;
    sets of preamble sequence numbers, used by the terminal for sending an initial RACH message to the radio communication network, are separated into subsets respectively associated with the HD-FDD models;
    the preamble sequence number of an initial RACH message is used to indicate to the radio communication network both a random access request by the terminal and an associated HD-FDD model selected by said terminal for wireless communication with the radio communication network; and
    the radio communication network derives the associated HD-FDD model from the received preamble sequence number.

2. The method of claim 1, wherein the selection of the HD-FDD model depends on the occupation rate of each HD-FDD model.

3. The method of claim 1, wherein the network accepts or rejects the HD-FDD model selected by the terminal.

4. A method of selecting a, Half Duplex Frequency Division Duplexing (HD-FDD) model for wireless communication entities comprising a terminal and a radio communication network, wherein:
    wireless communication between the radio communication network and the terminal is carried out according to a selectable HD-FDD model;
    the network or the terminal selects an HD-FDD model from among a set of models based on information from the terminal or from the network, respectively, according to selection rules known by said network and said terminal;
    information identifying the HD-FDD model selected by one entity is derived from information related to either an initial RACH message or to a random access response;
    temporary identity values TC-RNTI included in the random access response are separated into subsets respectively associated with an HD-FDD duplexing model; and
    from the receipt of an TC-RNTI value, the terminal derives the associated HD-FDD model.

5. A method of selecting a, Half Duplex Frequency Division Duplexing (HD-FDD) model for wireless communication entities comprising a terminal and a radio communication network, wherein:
    wireless communication between the radio communication network and the terminal is carried out according to a selectable HD-FDD model;
    the network or the terminal selects an HD-FDD model from among a set of models based on information from the terminal or from the network, respectively, according to selection rules known by said network and said terminal;
    information identifying the HD-FDD model selected by one entity is derived from information related to either an initial RACH message or to a random access response;
    the possible transmission times of the random access response are separated into subsets respectively associated with an HD-FDD model; and
    from the receipt of the random access response, the terminal evaluates the transmission time and thereby derives the associated HD-FDD model.

* * * * *